United States Patent
Subban et al.

(10) Patent No.: US 10,544,052 B2
(45) Date of Patent: Jan. 28, 2020

(54) DEVICES AND METHODS FOR REMOVING DISSOLVED IONS FROM WATER USING COMPOSITE RESIN ELECTRODES

(71) Applicants: THE REGENTS OF THE UNIVERSITY OF CALIFORNIA, Oakland, CA (US); Chinmayee V. Subban, Hayward, CA (US); Ashok J. Gadgil, El Cerrito, CA (US); Robert Kostecki, Lafayette, CA (US); Guoying Chen, Oakland, CA (US)

(72) Inventors: Chinmayee V. Subban, Hayward, CA (US); Ashok J. Gadgil, El Cerrito, CA (US); Robert Kostecki, Lafayette, CA (US); Guoying Chen, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 292 days.

(21) Appl. No.: 15/515,999

(22) PCT Filed: Oct. 5, 2015

(86) PCT No.: PCT/US2015/054093
§ 371 (c)(1),
(2) Date: Mar. 30, 2017

(87) PCT Pub. No.: WO2016/054659
PCT Pub. Date: Apr. 7, 2016

(65) Prior Publication Data
US 2017/0247268 A1    Aug. 31, 2017

Related U.S. Application Data

(60) Provisional application No. 62/059,777, filed on Oct. 3, 2014.

(51) Int. Cl.
  *C02F 1/46*    (2006.01)
  *C02F 1/42*    (2006.01)
  (Continued)

(52) U.S. Cl.
  CPC .............. *C02F 1/4691* (2013.01); *C02F 1/42* (2013.01); *C02F 1/4604* (2013.01);
  (Continued)

(58) Field of Classification Search
  CPC ...... C02F 1/42; C02F 1/46109; C02F 1/4695; C02F 2001/422; C02F 2001/425
  See application file for complete search history.

(56) References Cited

U.S. PATENT DOCUMENTS 4,790,918 A * 12/1988 Bridger ................. B01J 47/08
                                                      204/551
5,362,417 A    11/1994 Ziolo
(Continued)

FOREIGN PATENT DOCUMENTS

EP      2708514       3/2014

OTHER PUBLICATIONS

International Search Report and Written Opinion for PCT Application No. PCT/US2018/062472, dated Jan. 30, 2019, 12 pages.
(Continued)

*Primary Examiner* — Arun S Phasge
(74) *Attorney, Agent, or Firm* — Womble Bond Dickinson (US) LLP; Daniel E. Ovanezian

(57) ABSTRACT

The present invention provides for a device useful or removing dissolved ions from water comprising or configured to comprise composite resin electrodes. The present invention provides for a device useful for removing dissolved ions from water comprising or configured to comprise composite resin electrodes. The present invention also provides for a
(Continued)

method for removing dissolved ions from water comprising providing said device, and using it thereof.

11 Claims, 8 Drawing Sheets

(51) Int. Cl.
  *C02F 1/469* (2006.01)
  *C02F 1/461* (2006.01)
  *C02F 101/10* (2006.01)
  *C02F 101/14* (2006.01)
  *C02F 103/06* (2006.01)
  *C02F 103/08* (2006.01)
(52) U.S. Cl.
  CPC ............... *C02F 2001/46138* (2013.01); *C02F 2001/46157* (2013.01); *C02F 2101/103* (2013.01); *C02F 2101/14* (2013.01); *C02F 2103/06* (2013.01); *C02F 2103/08* (2013.01); *C02F 2303/16* (2013.01)

(56) References Cited

U.S. PATENT DOCUMENTS

| 5,804,057 A | 9/1998 | Zhou et al. |
| 2010/0147704 A1 | 6/2010 | Xiong et al. |
| 2017/0247268 A1 | 8/2017 | Subban et al. |

OTHER PUBLICATIONS

International Search Report and Written Opinion for PCT Application No. PCT/US2015/054093, filed Oct. 5, 2015, 10 pages.

* cited by examiner

DEVICES AND METHODS FOR REMOVING DISSOLVED IONS FROM WATER USING COMPOSITE RESIN ELECTRODES

RELATED PATENT APPLICATIONS

The application claims priority to U.S. Provisional Patent Application Ser. No. 62/059,777, filed Oct. 3, 2014; which is incorporated herein by reference.

STATEMENT OF GOVERNMENTAL SUPPORT

This invention was made with government support under Contract No. DE-AC02-05CH11231 awarded by the United States Department of Energy. The government has certain rights in the invention.

FIELD OF THE INVENTION

This invention relates generally to removing dissolved ions from water.

BACKGROUND OF THE INVENTION

In many areas of the world, surface water is unavailable for much of the year, and groundwater has high concentrations of dissolved ions. WHO recommends total dissolved solids (TDS) which consist of dissolved salts and silica in drinking water to be not more than 500 ppm, however in many parts of the world, the population has no recourse but to drink groundwater with TDS concentrations as high as 800 ppm, 1000 ppm, and even in some cases 1400 ppm.

Methods to reduce ionic concentrations to more palatable levels include distillation, solar distillation, reverse osmosis, and ion exchange. In many cases these are not considered affordable, practical, or effective (e.g., owing to lack of adequate capital, land surface, solar insolation, or energy access). For years, membranes and ion exchange have been used to lower TDS from water and wastewater. These methods are not economical, practical or efficient for poor populations in poor communities for drinking water treatment, since they require high capital investment, substantive maintenance, large scale engineering, and energy inputs, and/or toxic and corrosive chemicals handling for regeneration.

The basic concept for separating compounds that are dissolved in water using electrical mean is quite old—dating to 1950. The technology began to be refined starting in 1990. Capacitive Deionization (CDI) is a process that applies a direct current electrical bias across a pair of electrodes immersed in the aqueous electrolyte to separate positively charged cations and negatively charged anions via migration and physical adsorption at the electrodes. For instance, in saline waters the positively charge sodium migrates to the negative electrodes and the negatively charged chloride ion will migrate to the positive electrode.

The Electronic Water Purifier (EWP) is a new technology developed in the last 10 years that has low operating costs, low rejection wastewater volume, low capital expenditure, no chemical requirements, a small footprint and is now available in sizes ranging from under-the-sink water purifiers to large commercial units. They use a CDI process to remove dissolved ions from water by using a semi-permeable membrane that coats the electrodes. The device consists of multiple layers including coated electrodes that contain a conductive surface sandwiched between layers of activated carbon. A non-conductive spacer material separates the plates from one another, while allowing a flow of water between the electrodes, parallel to the electrode surfaces.

In common practice, these electrodes are alternately connected to the two sides of a DC power supply. The device works on the principle of capacitive deionization to purify water, with the application of a low voltage DC potential to attract and discharge ions to the electrode surface. The high-surface-area carbon electrode layers attract and hold ions on their surface removing them from the water stream flowing through the inter-electrode gaps. After some time interval of such operation, all the charged sites are filled, and the device must then be regenerated by discharging the ions from the electrode surfaces. This is accomplished by shorting the electrodes and reversing the polarity of the applied DC potential. Once a substantial number of the newly displaced ions are flushed in the waste stream, after a length of time, the unit begins to charge again by attracting ions from the feed solution under the influence of the reverse potential.

However, this method is still by a relative slow mass transfer across the electrolyte and inadequate ion storage capacity and relatively high operation cost. Currently, there are no comparably inexpensive methods to reduce ionic salts appearing as total dissolved solids (TDS) in drinking water. Those who can afford it, purchase bottled water, or water treated with Reverse Osmosis or other methods. However, much of the population exposed to high levels of TDS is poor. Individuals from these populations do not have access to effective means to reduce TDS of potable water.

Most of the CDI devices thus far used commercially use carbonaceous electrodes. Activated carbons, carbon aerogels, and carbon nanotubes offer high surface active area and relatively large ion storage capacity. However, such electrodes are often brittle and difficult to handle, their dense nanoporous structure is hardly accessible to solutions which impedes rapid mass transfer, and some of these nanoengineered materials are prohibitively expensive.

SUMMARY OF THE INVENTION

The present invention provides for a device useful for removing dissolved ions from water comprising or configured to comprise composite resin electrodes. The present invention also provides for a method for removing dissolved ions from water comprising providing said device, and using it thereof.

The present invention provides for a system for removing dissolved ions from water, comprising: (a) a first electrode in contact with a first plurality of ion exchange resin (IER) particles, (b) a second electrode in contact with a second plurality of IER particles, (c) an voltage source, (d) a chamber defined by the first electrode and the second electrode, (e) an inlet, (f) a first outlet, and (g) optionally a second outlet, wherein the first electrode, the second electrode, and the electricity source are in electrical communication with each other, and the chamber is in fluid communication with the inlet, the first outlet, and optionally the second outlet, and optionally the voltage source is configured so that the direction of a current to the first electrode and the second electrode can be switched.

The present invention also provides for a system for removing dissolved ions from water, comprising: (a) an inlet, (b) a first electrode in contact with a first plurality of ion exchange resin (IER) particles, (c) an insulating separator, (d) a second electrode in contact with a second plurality of IER particles, (e) an outlet, and (f) an voltage source, wherein (i) the insulating separator separates the first electrode and the second electrode, (ii) the first electrode, the second electrode, and the electricity source are in electrical communication with each other, and (iii) there is fluid communication in the following order: the inlet, the first electrode, the insulating separator, the second electrode, and the outlet, and optionally the voltage source is configured so that the direction of a current to the first electrode and the second electrode can be switched. In some embodiments, the first plurality of IER particles comprises cation exchange resin (CER). In some embodiments, the second plurality of IER particles comprises anion exchange resin (AER). In some embodiments, the IER particles are spherical having an average diameter of about 0.5 mm. In some embodiments, the electrode comprises one or more metal meshes wherein the IER particles are packed into metal meshes.

During operation, a device or apparatus comprising the system has two steps: a desalinating step and a regenerating step. During the desalinating step, ion-containing water flows into the system and the cations in the ion-containing water associate with the CER, and the anions in the ion-containing water associate with the AER. Water flowing out of the outlet is deionized water, and has fewer ions than the ion-containing water flowing into the inlet. The AER and CER are capable of trapping charges (chemically) without any applied potential. During the regenerating step, the saturated CER and AER (or spent CER and AER) are regenerated by applying a voltage to the electrodes. In this system, the IER particles are electrically conducting, and do not need to be part of a "composite" electrode. In this system, a voltage does not need to be applied for the desalinating step, and a voltage only needs to be applied for the regenerating step.

In some embodiments, at least part or all of the IER particles of the first and/or second pluralities of IER particles are particles produced by the ball milling of IER beads. In some embodiments, at least part of all of the IER particles of the first and/or second pluralities of IER particles comprise a surface that is conducting. In some embodiments, the conducting surface is made by pyrolyzing the bead surface. In some embodiments, a surface of a IER bead is pyrolyzed. In some embodiments, the IER particles or IER beads have an average surface area of equal to or more than 1,000 $m^2/g$, 2,500 $m^2/g$, 5,000 $m^2/g$, 7,500 $m^2/g$, 10,000 $m^2/g$, or 12,500 $m^2/g$, or within any range of one thereof to equal to or less than 15,000 $m^2/g$.

In some embodiments, the first electrode is the cathode, and at least part or all of the IER particles of the first plurality of IER particles are cation exchange resin (CER). In some embodiments, the second electrode is the anode, and at least part or all of the IER particles of the second plurality of IER particles are anion exchange resin (AER). In some embodiments, the first electrode and/or second electrode comprise wire meshes, wherein the IER particles are embedded on the surface of, held in place by, or both, the wire meshes. In some embodiments, the first electrode and/or the second electrode comprise one or a plurality of wire meshes that support a plurality of layers of IER particles.

In some embodiments, as shown in FIG. 1B, the system comprises a device or apparatus 1 comprising: (a) a first electrode 2 comprising a first surface 3 in contact with a first plurality of IER particles 4, (b) a second electrode 5 comprising a second surface 6 in contact with a second plurality of IER particles 7, (c) an voltage source 8 in electrical communication with electrode 2 via a first electrical contact 9, and with the second electrode 5 via a second electrical contact 10, (d) a chamber 11 defined by the first electrode 2 and the second electrode 5, (e) an inlet 12, (f) a first outlet 13, (g) a second outlet 14, (h) optionally a means 15 for sealing the inlet 12, (i) optionally a means 16 for sealing the first outlet 13, and (j) optionally a means 17 for sealing the second outlet 14. In some embodiments, the first outlet 13 and the second outlet 14 are the same. Arrow 18 defines the direction of flow of ion-containing water into the chamber 11 via inlet 12. Arrow 19 defines the direction of flow of deionized water out of the chamber 11 via the first outlet 13. Arrow 18 defines the direction of flow of waste water out of the chamber 11 via the second outlet 14. Arrow 21 defines the direction of flow of ion-containing water out of the chamber 11. In some embodiments, the IER particle comprises a surface coated with carbon 22. In some embodiments, the first surface 3 and/or the second surface 5 are modified to increase the surface area of the first surface 3 and/or the second surface 5. In some embodiments, when the first outlet and the second outlet are the same, the system comprises a means to divert the flow from the first outlet to more than one direction. In some embodiments, the direction of the potential applied by the first and/or second pairs of electrodes is perpendicular to the direction of water flow.

In some embodiments, the first electrode and/or second electrode comprise multiple layers of wire meshes and each layer of wire mesh comprises a layer, such as a monolayer, of IER particles (see FIG. 10). Each layer is separated from the next, or adjacent, layer with an ion-permeable insulating layer, such as an insulating porous spacer, or a layer of aerogel. Multiples of such layers make up the electrode. Each wire mesh is provided with a different voltage so that a voltage gradient is established within each electrode, thereby resulting in a deeper penetration of ions in the electrode, and a larger capture capacity for ions before the need for regeneration.

The present invention provides for a method for removing dissolved ions from ion-containing water comprising: (a) providing the system or apparatus for removing dissolved ions from ion-containing water of the present invention; (b) flowing ion-containing water into the chamber via the inlet, (c) optionally running a direct current through the water via the first electrode and second electrode, (d) continuously flowing ion-containing water from the inlet into the chamber and out of the first outlet, wherein, in the chamber, one or more cations in the ion-containing water associate to a IER particle of the first plurality of IER particles and one or more anions in the ion-containing water to associate to a IER particle of the second plurality of IER particles, such that deionized water flows out of the chamber via the first outlet, (e) stopping the flow of the ion-containing water of step (d), (f) running a direct current through the water in a direction reverse to the direct current of step (c) such that the cations dissociate from the IER particle of the first plurality of IER particles and the anions dissociate from the IER particle of the second plurality of IER particles to form waste water in the chamber, (g) flowing the waste water out of the chamber via the second outlet, and (h) optionally repeating steps (d) to (g).

The present invention provides for a method for removing dissolved ions from ion-containing water comprising: (a) providing the system or apparatus for removing dissolved ions from ion-containing water of the present invention; (b) flowing ion-water containing water into the system via the inlet, such that cations in the ion-water containing water associate with the CER, anions in the ion-water containing water associate with the AER, and water flowing out of the outlet has fewer ions than the ion-containing water flowing into the inlet, (c) regenerating the CER and AER comprising (i) flowing water containing fewer ions into the system via the inlet, (ii) closing the outlet, and (iii) applying a voltage to the CER and AER, such that the cations disassociate from the CER and the anions disassociate from the AER, (d) opening the outlet to let the water containing the disassociated cation and anions in the system flow out, and (e) optionally repeating steps (b) to (e). In some embodiments, the water containing fewer ions of step (c) (i) is water obtained from step (b).

In some embodiments, the ion removed is any cation having an atomic number equal to or larger than 3. In some embodiments, the cation is an element of Group 1 or 2, or any cation with a valence of 1+ or 2+. In some embodiments, the cation is $Li^+$, $Na^+$, $K^+$, $Be^{2+}$, $Mg^{2+}$, or $Ca^{2+}$. In some embodiments, the ion removed is any anion having an atomic number equal to or larger than 5. In some embodiments, the anion is an element of Group 16 or 17, or any anion with a valence of 1− or 2−. In some embodiments, the anion is $F^-$, $Cl^-$, $Br^-$, $O^{2-}$, $S^{2-}$, or $Se^{2-}$.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1A:
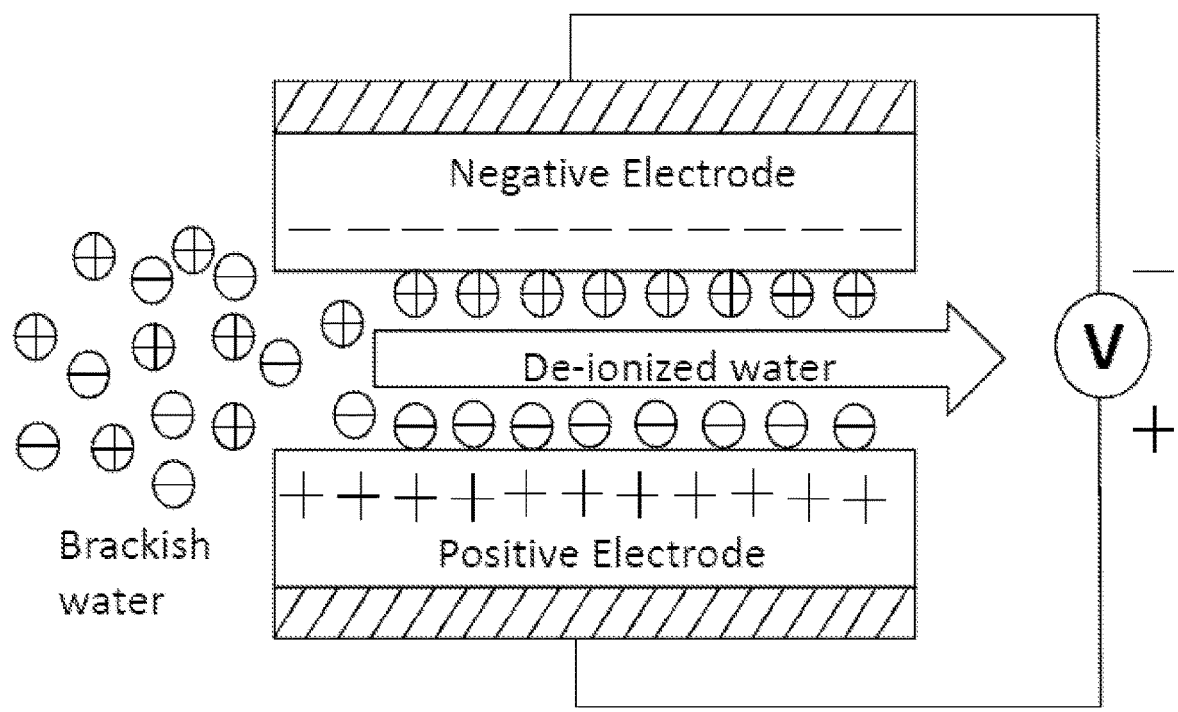
FIG. 1A. Schematic of CDI apparatus. Brackish water flows between two electrodes held at a constant voltage difference. The ions in the influx are drawn to and held at oppositely charged electrode surfaces. The layer of charge inside the electrode and the layer of oppositely charged ions outside the electrode constitute the "electric double layer." Once the electrode surface area is saturated with ions, the flow is stopped and voltage reversed, so the ions re-enter the solution. This highly concentrated solution is passed to a waste stream, and the process repeats.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "an ion" includes a plurality of such ions, and so forth.

The term "about" refers to a value including 10% more than the stated value and 10% less than the stated value.

The term "particles" also encompasses "beads".

These and other objects, advantages, and features of the invention will become apparent to those persons skilled in the art upon reading the details of the invention as more fully described below.

In some embodiments, the system comprises the building of a series of hybrid CDI/ion (cation and anion) exchange composite electrodes for ion transport, capture and removal. The ion exchange process can be controlled and accelerated via potential polarization. IER can be coated or impregnated with a conductive medium, such as carbon black (i.e., soot), and these modified particles are used to form anode and cathode (using anion type and cation type resins) of a CDI device. The electric field is used to draw ions to these electrodes. Once the ions reach the IER, they are captured with ion exchange occurring in the resin. As the electric field is relaxed or reversed, the IER is regenerated with the protons and hydroxyl ions generated at the conductive matrix of the composite electrodes, allowing regeneration without need for toxic and corrosive chemicals.

In some embodiments, the conducting medium could be impregnated into the IER either (a) during the synthesis or final physical processing of the IER itself, or (b) by reprocessing commercially available resins. Path A would require re-engineering the synthesis process. Path B requires developing a method of coating the resin particles with a layer of conductive carbon that is both thin and/or porous enough to allow ions to reach the IER and thick enough to provide a continuous and low resistance path of electronic conductivity within the composite electrode.

One method of coating commercially available IER with thin layers of carbon would involve using a methane flame to generate soot. To achieve a uniform 3D coating a fluidized bed may be used. Coated beads could be attached to a wire mesh to facilitate conductivity and electrode integrity. Soot layers can be hydrophobic—they would be converted to hydrophilic surfaces with exposure to ozone or $H_2O_2$ prior to use.

Another method uses plasma to pyrolyze the surface layer of the existing organic resin grains. The process would be tuned to create a thin layer of carbon without overheating and destroying the resin. In addition, one can try to reach the higher conducting sp2 coordination state of carbon as opposed to hard carbons, which include non-conductive sp3 and sp coordinated structures. A metal catalyst, such as Cu or Ni, could be deposited on the resin prior to pyrolysis to promote growth of carbon nanotubes and other high surface area carbon structures, increasing the ion removal capacity and also conductive properties.

Another approach involves making electrodes from multiple layers: each layer comprising a conducting fine wire mesh layered with a monolayer of IER beads/particles, separated from the next layer with a non-permeable insulating layer, which can be an insulating porous spacer (or a thin layer of aerogel). Multiple layers make up the electrode. Each wire mesh is given a different voltage so a voltage gradient within the electrode is establish, allowing deeper penetration of ions in the electrode, and a larger capture capacity for ions before the need for regeneration.

In some embodiments, microfluidic channels can be used to aid the separation of concentrated ion solution from free-ion solution. A silica aerogel can be used as an insulator between the electrodes. The aerogel can fully occupy the space between the electrodes and suppress diffusive remixing of the separated ions. In another embodiment, a thin layer of silica aerogel coats the electrodes, leaving a small gap that forms a microfluidic channel between the electrodes. This avoids the high pressure gradient needed to push the water through the gel, while still suppressing remixing of ions. The thin layer of gel acts as a porous insulator only, allowing the ions to pass through to the electrode perpendicular to the direction of water flow (which would not be through the aerogel).

This invention is useful for creating new affordable water sources by desalination of low salinity sources such as brackish and surface waters, and for water reuse and recycling (such as from municipal and industrial wastewater reclamation) by removing trace contaminants from polluted streams. Another application is for the removal of toxic, naturally occurring ionic contaminants, such as arsenic and fluoride, from ground water supplies.

The invention having been described, the following examples are offered to illustrate the subject invention by way of illustration, not by way of limitation.

Example 1

Treating Brackish Drinking Water

Summary

We aim to develop a novel technology to affordably make brackish water potable for the rural developing communities that are increasingly dependent on brackish sources.

The Brackish Water Challenge

One in three people lived in water—stressed regions in 2006, and that number is expected to double by 2015.1 Traditionally reliable surface sources, fed by precipitation or glacial melt, face threats from climate change, while fresh groundwater is often chronically oversubscribed. Indeed, 60% of India's groundwater resources are expected to be depleted within 20 years.2 While such water stress contributes to a host of problems, shortages in potable drinking water are among the most acute.

Seawater intrusion, agricultural practices, and contamination from industry are making fresh sources increasingly saline.3 Freshwater shortages, combined with these salinization effects, mean communities are increasingly dependent on brackish sources for drinking water. Already, saline groundwater is the sole source in much of Namibia, and peninsular India.3 Today, an estimated 1.1 billion people live in places with saline ground water.3

Without treatment, this water is so salty that drinking it comes with great suffering. For this reason, the US EPA limits drinking water to less than 500 ppm total dissolved solids (TDS), as a secondary regulation.4 Currently, the dominant method for treating such waters is reverse osmosis (RO), but high energy requirements make it costly.5 Not surprisingly, areas with rising dependence on saline sources have observed a corresponding rise in the cost of potable drinking water.3 As such, the burdens of this issue are felt disproportionately by the poorest in such regions.

The brackish water challenge is then to make affordable (<$1/tonne) potable water (TDS<500 ppm) from the abundantly available brackish (TDS 1,000-3,500 ppm) sources. Such a treatment method could provide new sources of drinking water for those who cannot afford the current alternatives.

The CDI Approach

To address this challenge, we will explore two novel and potentially game-changing approaches to capacitive deionization (CDI) technology, in the expectation of lowering initial costs, decreasing energy requirements, and improving efficiency, thereby developing a viable brackish water treatment method for rural developing world communities. CDI is a low-energy, electrochemical method for removing ions from water by drawing them to charged electrodes and trapping them in electric double layers that form at the electrode surfaces. In a typical CDI configuration (FIG. 1A), water flows between two parallel-plate electrodes, which are charged by applying an external voltage. As the brackish water enters, the charged ions—which constitute most of TDS—drift to the oppositely charged electrodes, where they are held at the surface. The applied cell voltage is kept low enough (1.0-1.4 V) that trapped ions do not transfer their charge, and chemical bonds do not form. Eventually, the surface area of the electrodes becomes saturated with ions, and the electrodes must be regenerated. At this point, the flow is stopped, the voltage is turned off (or reversed), and the ions re-enter solution where they can be routed to a waste stream. Following regeneration, the process can begin again.

Figure 2:
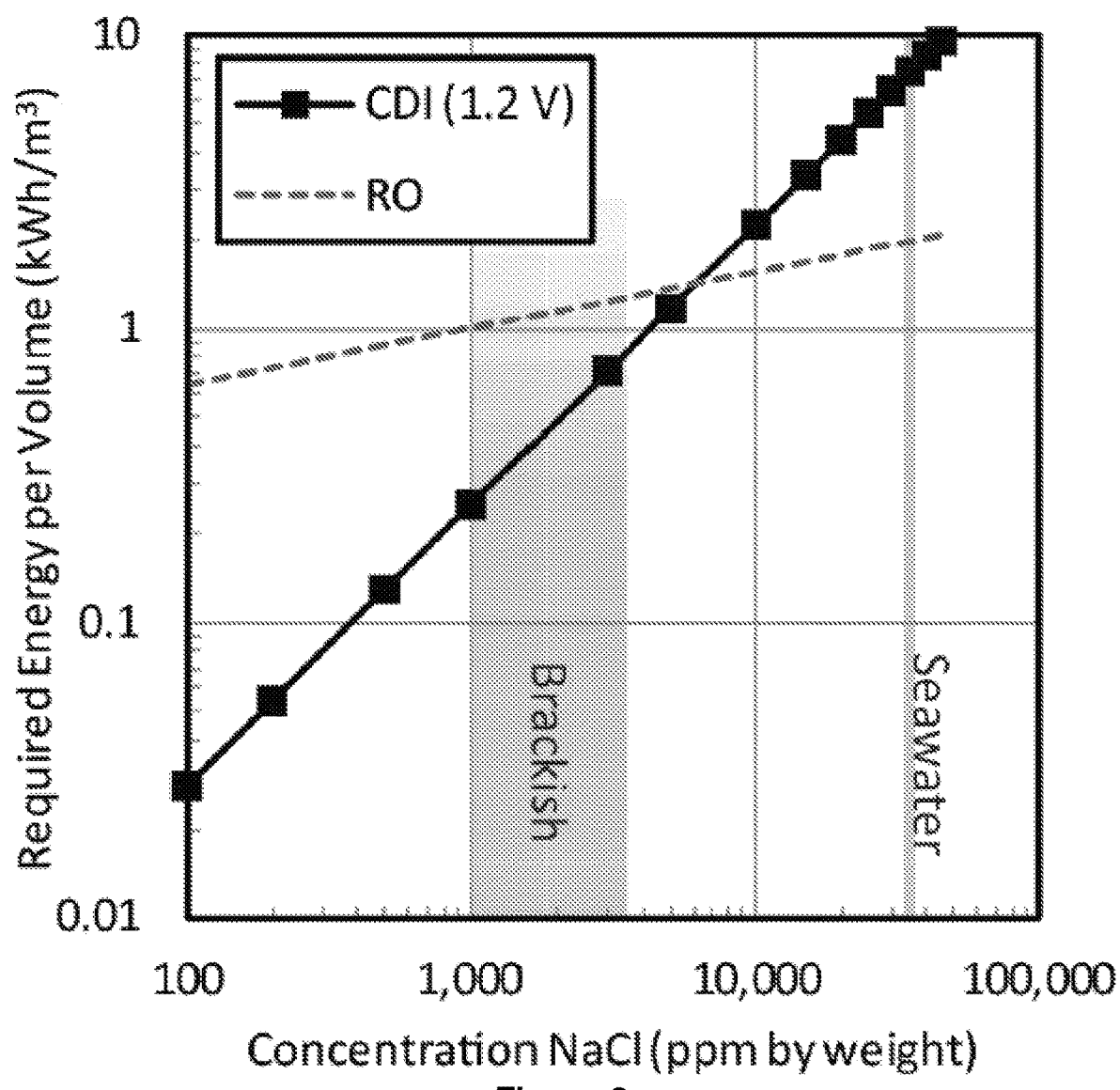
FIG. 2. Energy consumption for CDI as a function of influent NaCl concentration, compared with RO desalination. Adapted from Oren (cited in Example 1).

The energy requirements for CDI are a strong function of the influent concentration. More energy is required to treat higher-concentration influents. As a result, the energy required to treat seawater is higher than that with RO, but CDI has the potential to treat brackish waters for significantly less energy than is required for RO (see FIG. 2).6

The electrode material properties are also important. To perform well, the material must have high electrical conductivity, chemical stability over a wide variety of possible influents, and high surface area available for adsorption of ions.6 Carbon aerogels, used frequently for such applications, have specific surface areas of 400-600 $m^2/g$.7

Currently, much of CDI research is aimed at increasing the capacity of electrodes, usually by exploring exotic and expensive materials.8,9 As such, these efforts are unlikely to provide affordable solutions for developing communities' needs. Correspondingly, technology development has focused largely on industrial-world applications.10,11

Despite the current focus of CDI research, the technology offers unique advantages for developing-world markets. The low energy requirement means smaller operating costs and lower infrastructure requirements. Operation requires no external chemistry or consumables, so it does not require supply chains for rare materials. Finally, the ability to operate efficiently at small scales means CDI can be affordable even in remote, rural settings.

By focusing on brackish water and the unique needs of rural developing communities, we were able to identify CDI as a technology with particular promise for this specific problem. To realize that promise, however, we must still tailor CDI to address the brackish water challenge. To that end, we propose to explore two novel approaches, for which invention disclosures have been filed. The first has the potential to reduce electrode cost, thereby lowering first costs of a CDI cell. The second has the potential to dramatically improve efficiency, thereby lowering operational energy costs. We see such efforts as the necessary first steps to achieving a breakthrough in such treatment systems.

Affordable Electrodes

Currently, the high cost of electrode materials represents the largest single cost for a CDI cell, and likely the largest barrier to CDI as a solution in the developing world. Our first approach focuses on fabricating an effective, affordable electrode which incorporates both double layer trapping and chemical bonds.

Our affordable electrode incorporates ion exchange resins (IERs). IERs capture ions via chemical bonds, releasing other, harmless ions back into solution. Indeed, IERs have already been used in water purification,12 but existing IER-based water purifiers require regeneration using corrosive chemicals. The resulting risks and chemical supply chains make them non-ideal for developing world applications. However, an IER-based CDI electrode may allow us the benefits of ion exchange, but with an electrical regeneration mechanism, thus eliminating the need for these supply chains.

Figure 3:
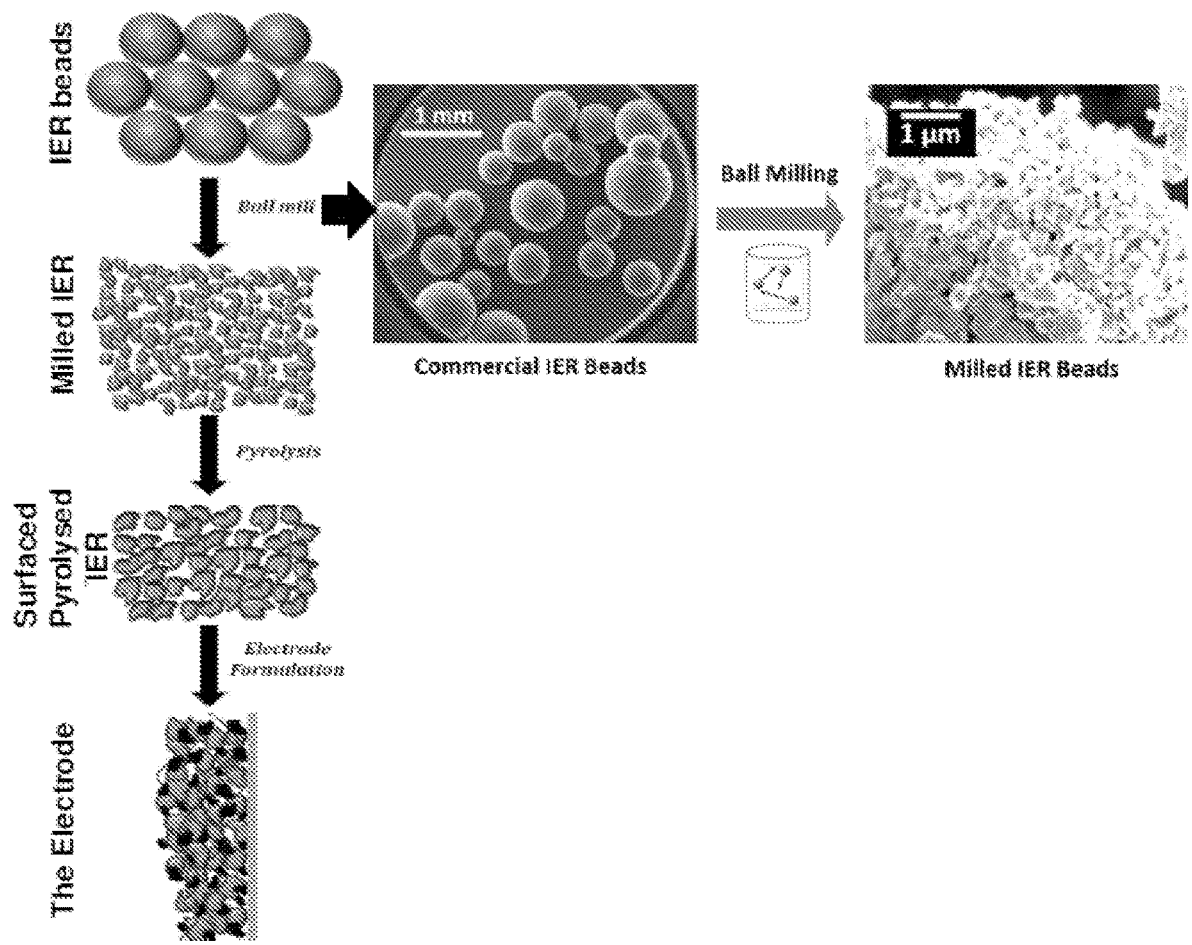
FIG. 3. Proposed method of electrode preparation starting from commercial IER beads. The final electrode contains pyrolyzed IER along with carbon black (black) and polymer binder (fibers) on a metal contact.

IERs are affordable and commercially available in a variety of bead sizes (0.3-1.25 mm). They are offered with different functional groups, which dictate the polarity of the ions exchanged and the ions released into solution. Off-the-shelf IER beads, however, are not electrically conductive and have small specific surface areas (~45 $m^2/g$),13 two issues that will have to be addressed in our fabrication process (FIG. 3).

Surface area can be increased by decreasing the average particle size, which can be achieved by common techniques such as ball milling (or cryomilling for soft polymer-based materials). Such methods have been shown to increase the total surface area by as much as 250 times.14 To further improve the surface area and simultaneously increase electrical conductivity, the surface of the milled IER can be pyrolyzed by heating to 700-1000° C. for a very short time. Wilson, et al. have demonstrated this using heated argon gas,13 though we may also explore alternative methods (plasma torch, fluidized bed heating, or gunpowder reaction) to achieve the required properties (pyrolysis depth, carbon structure, transition thickness). One pyrolyzed, the conducting high-surface-area IER can be mixed with carbon black and polymer binders, and painted as a thin film over metal to form a functional electrode. These binding and adherence methods can be adapted from those already optimized for battery electrodes.15

We expect this process to produce an electrically conductive, high surface area electrode capable of ion exchange. Here, the electric field will drive ions to the electrode edge. Migration through the electrode to the IER surface will be driven by diffusion. Finally, the contaminant will be retained due to chemical attraction at specific functional groups in the resin. As with traditional CDI, regeneration will be affected electrically, rather than chemically.

This method represents an entirely new approach to CDI with the potential for affordable, high-capacity electrodes. Here, the central challenge is developing and optimizing the fabrication methods (milling, pyrolysis, binding, adherence) in a way that produces optimal material properties. Success here will not only constitute the first electrically regenerable ion exchange resin, but also lower first costs for CDI.

Voltage Pulsing

Our second approach to make CDI more affordable aims to decrease the amount of electrode material required. Here, we propose a novel voltage pulsing design to increase the drift rate of influent ions. This will make CDI cells smaller, electrodes shorter, and perhaps improve overall capacity.

A number of molecular arrangements can slow electrically induced motion of ions. In a strong electrolyte, an ion will be surrounded by a cloud of oppositely charged ions, with will be pulled in the opposite direction by a field. In a weak electrolyte, many ions remain paired with oppositely charged counterparts, also pulled in the opposite direction. Finally, ions attract a bulky sphere of water molecules, which must be dragged through the solution. All such molecular arrangements, however, can be disrupted by sufficiently strong electric fields. These disruptions are collectively known as the Wien effects.16

In normal configurations, the voltages required to produce these fields would be sufficient to induce undesirable reduction and oxidization (redox) reactions at the electrode surfaces, rendering the two designs incompatible. However, the relative time-scales offer an exciting possibility. The time scales for breakup of molecular arrangements via the Wien effects are shorter than those for instigating redox reactions. Therefore, short (likely µs), high voltage pulses may allow us to break up the detrimental molecular arrangements without inducing redox reactions.

With increased ion mobility, the ions would reach the electrodes sooner, decreasing the required residence time for water being treated. This, in turn, would mean the same treatment rate could be achieved with considerably less electrode material, which would have a substantial impact on overall cost. Alternatively, increased ion mobility would allow for operation at lower DC voltages, improving overall efficiency. Finally, the approach may increase the electrode's total ion capacity, as experimental evidence suggests double layer capacity is dominated by the ion's hydrated radius, which includes the sphere of water molecules.7

If successful, this effort would represent the first use of Wien effects in CDI. Further, achieving Wien effects with pulsed fields has seen little exploration. Most importantly, the combined efforts would create a substantially more affordable CDI cell, opening the door to markets that could otherwise not afford treatment.

Measuring Outcomes

For the IER approach, we intend to develop a method for fabricating the electrode material and confirm its physical properties. This confirmation will require advanced characterization methods, as well as the expertise available at Lawrence Berkeley National Lab's Batteries Group. Specifically, we intend to measure IER particle size and carbon thickness via electron microscopy and characterize carbon surface formations via Raman spectroscopy. Other methods will likely be introduced as they prove necessary. This will set the stage for electrode creation, device testing, and iterative tuning of our methods.

For the voltage pulsing approach, we aim to observe pulse-based Wien effects, and understand what this arrangement can provide in terms of improved efficiency, improved surface capacity, and reduced electrode size. In this grant period, we intend to design, build, and test a prototype apparatus capable of performing CDI both with and without such pulsing. Using this system, we can perform side-by-side measurements to identify improvements in ion mobility, electrode capacity, and required residence time. Specifically, we will measure changes in ion mobility and residence time by comparing effluent concentrations over varying flow rates. We can observe electrode capacity by running the system until breakthrough, marked by a rapid rise in the effluent's ion concentration. This occurs when all usable spaces in the electric double layers are filled and ions can no longer be removed from solution.

Finally, we will produce an economic estimate of the cost to bring brackish water to potable levels under real conditions, based on the current state of our efforts.

REFERENCES CITED

1 The United Nations World Water Development Report 2. UNESCO: Paris (2006).
2 Deep Wells and Prudence: Towards Pragmatic Action for Addressing Groundwater Overexploitation in India. World Bank: Washington D.C. (2010).
3 van Weert, F., et al. Global Overview of Saline Groundwater Occurrence and Genesis. IGRAC Report: Utrect (2009).
4 Drinking Water Standards and Health Advisories. US Environmental Protection Agency (EPA 822-S-12-001): Washington, D.C. (2012).
5 Subramani, A., et al. Water Research 47 (2007) 1907.
6 Oren, Y. Desalination 228 (2008) 10.
7 Gabelich, C. J., et al. Environmental Science & Technology 36 (2002) 3010.
8 Li, H. B., et al. J Materials Chemistry 19 (2009) 6773.
9 Gao, Y., et al. Thin Solid Films 517 (2009) 1616.
10 Conway, B. E., et al. Electrochimica Acta 47 (2005) 705.
11 Welgemoed, T. J., and C. F. Schutte. Desalination 183 (2005) 327.
12 Hubicki, Z., et al. In: Adsorption and Its Applications in Industry and Environmental Protection, Vol II: Applications in Environmental Protection 120-A (1999) 497.
13 Wilson, M. S., et al. Journal of Materials Chemistry 21 (2011) 7418.
14 Yim, S. P., et al. Waste Management Symposia 2 (1991) 295.
15 Marks, T., et al. Journal of the Electrochemical Society 158 (2011) A51.
16 Luitjen, E. Nature Physics 9 (2013) 606.
17 Novogratz, J. Innovations 2 (2007) 19.

Example 2

Novel Electrode Materials for Water Treatment with CDI

One in three people lived in water stressed regions in 2006, and the number is expected to further increase as a result of climate change and population growth. The potable water shortage along with the increased salinization of fresh water sources due to agricultural practices and industrial effluents[1], has forced communities to depend solely on saline sources for drinking water. As a result, areas with rising dependence on saline sources have observed a corresponding rise in the cost of potable drinking water.[1] The people in these water-stressed areas must either choose to risk potential health effects of consuming untreated saline water[3] or pay elevated costs to access treated water. Given the high cost of existing treatment and distribution methods, the issue disproportionately burdens the poorest in the region. Hence there is a critical need to develop an affordable method of treating saline water.

Naturally occurring saline water can be found with varying concentrations of total dissolved solids (TDS), and the method of desalination should be optimized to the TDS levels found in the water source to maximize energy efficiency and minimize cost. The most prevalent method of treating saline water, reverse osmosis (RO), is most efficient for treating high TDS water, making it best suited for treating seawater (35,000 ppm) in coastal regions. This generates a major overhead cost for distribution inland, which is in addition to the already high cost of the treatment itself.[4]

Much of the saline water available inland is brackish water with lower TDS concentration (1,000-10,000 ppm). Brackish water is the most commonly used saline water source, but its low concentration and dispersed nature, precludes efficient use of RO treatment. Thus far, there is no method implemented to efficiently treat brackish water, but such a method will have clear socioeconomic and health impacts for the poor in developing countries. There is, therefore, a well justified need to develop a new treatment approach tailored to reduce TDS concentration (United States EPA requires <500 ppm)i in brackish water. Such a treatment approach could provide new sources of drinking water for those who cannot afford the current alternatives.

Capacitive deionization (CDI) is potentially a highly energy-efficient method for treatment of brackish water. The minimal supply chain and the resulting low cost make CDI a good choice for the developing world. Further, the ability to operate CDI on a small scale makes systems feasible in remote and rural settings. The energy requirement for CDI increases linearly with the concentration of ions in solution, and therefore, at low TDS (<10,000), CDI uses much less energy than RO. CDI's lower maintenance cost than RO is another attractive feature for its affordability.

Figure 1B:
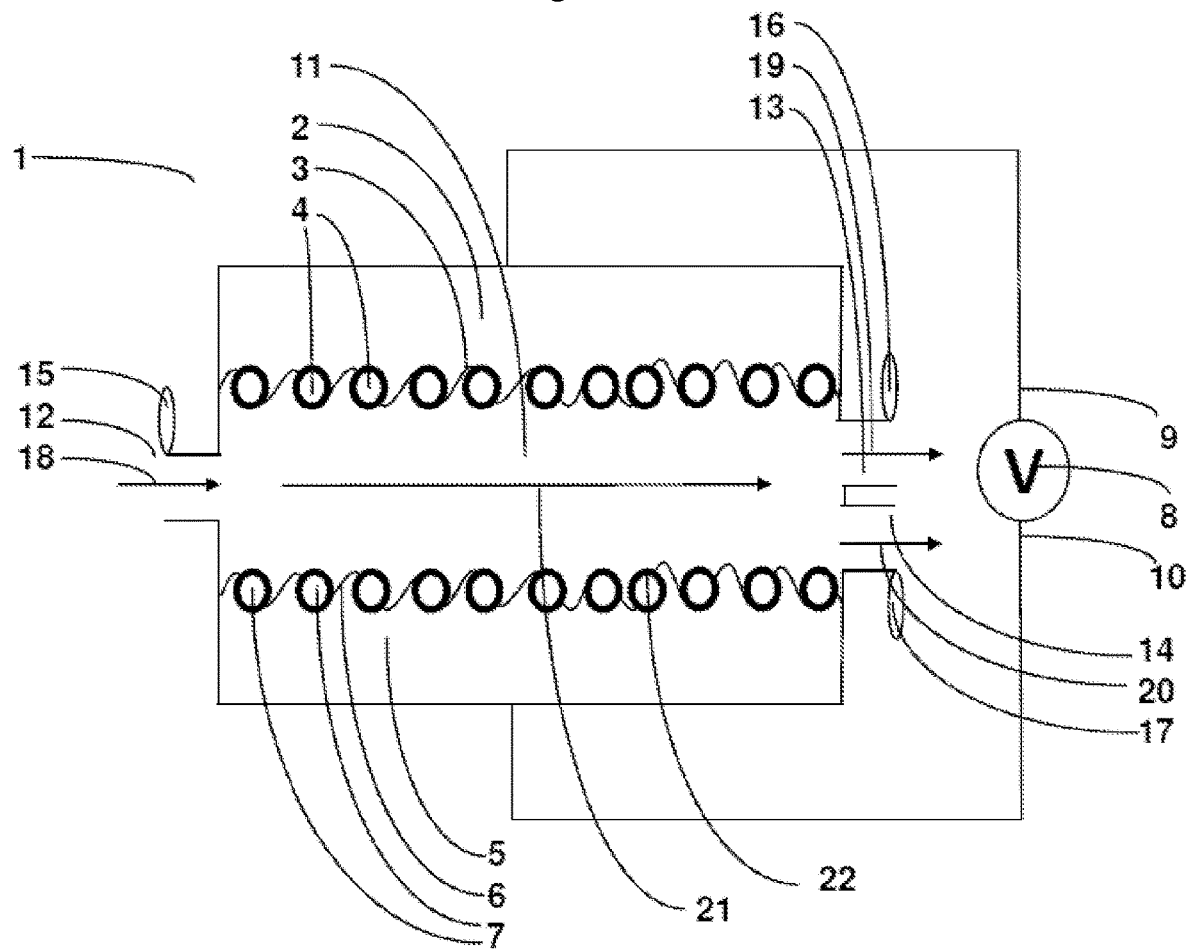
FIG. 1B. An embodiment of the apparatus of the present invention.

In a typical CDI, high-TDS inlet water flows between two parallel plate electrodes charged with an external voltage (FIG. 1). The applied voltage drives the charged ions to the oppositely charged electrodes. By keeping the applied voltage to a minimum, charge transfer is prevented and the ions are just held at the electrode surface. Once the electrode surface is saturated with ions, the flow of influent is paused, and the voltage reversed (or turned off) releasing the ions to re-enter the solution. This solution containing high concentration of ions is then directed to the waste stream. The re-charged electrodes are ready for the entire process to repeat.

Opportunity

There are, however, several challenges to overcome prior to commercialization of CDI technology. Scientists at LBNL recently filed a Record of Invention (ROI) outlining several methods to drastically reduce operating costs in CDI. One of those methods involves the development of new electrode materials. Such new materials must be chemically robust, electrically conducting, have high surface area, and be inexpensive for developing world applications. Further, the material must be easily incorporated into the electrode architecture. While there are several high surface area materials available and some of them have even been tested for CDI,[5-7] they are generally limited by the fraction of measured surface area accessible for ion exchange.[5] There is, thus, a need for new porous materials that not only have high surface area, but are also optimized for efficient ion exchange. Thus far, most of the CDI research has been aimed at making exotic materials that are unlikely to lead to practical products for developing world applications.[8-10]

Research Goals

The success of CDI technology depends on new and efficient electrode materials. Through this fellowship, I intend to prepare and test such new and novel electrode materials as a step toward building a low cost CDI-based water purification system tailored for brackish water sources, initially targeting rural low-income areas in developing countries where the need is the greatest. The electrode materials will be designed keeping in mind material and processing costs, while simultaneously attempting to explore novel approaches that have not been previously reported.

Electrode Materials for CDI

Desirable electrode materials for CDI must have high electrical conductivity, sufficient chemical stability, and high surface area available for ion adsorption.[11] Several high surface area, conducting, carbon-based materials have even been tested for CDI,[5-7] but they generally show limited ion exchange.[5] There is a need for new materials with enhanced ion-exchange capabilities. Exploring new and elaborate 3D-carbon architectures (the status-quo) is unlikely to provide low-cost electrodes for developing world applications. Hence we propose the use of carbonized ion exchange resins (IER). IERs are produced in large quantities for a variety of applications including water purification.[12] However the existing IER-based water purifiers need regular chemical regeneration requiring a chemical supply chain, which makes them non-ideal for the developing world. An electrically recharged IER-based CDI purification technology would reduce the chemical supply chain and cost.

IERs are commercially available in a variety of bead sizes (0.3-1.25 mm) allowing for the optimization of the electrode structure. Further, the beads are offered with different functional groups which can be used to target specific types of ions in the water (anions vs. cations). Hence, developing an IER-based electrode material for CDI applications could combine the ion-capture abilities of IER with all of the positive attributes of CDI. Two key challenges to overcome for using IER for CDI applications are: (i) the beads are electrically insulating, and (ii) the total surface area of these IER beads is not very high (45 $m^2$/g).[13] Below are described ways to overcome these challenges and prepare an IER-embedded CDI electrode.

Stage 1: Electrode Formulation Based on Standard Battery Electrodes

In Li-ion batteries, when the active material is not sufficiently conducting, the use of a conducting carbon in the electrode formulation has been shown to provide sufficient conductivity. This approach can be applied to our CDI electrode materials by mechanically mixing IER and conducting carbon, which can then be painted as a thin film on the metal contacts of the CDI.[14] This simple and easy method of electrode preparation is a good first step, both as a proof-of-concept experiment and a baseline for other more complicated IER-based electrode designs discussed below.

Stage 2: Increasing Surface Area and Surface Pyrolysis of IER

Drawing again from battery studies, the electrode performance of insulating materials such as $LiFePO_4$ have been shown to significantly improve both when the average particle size is decreased and when the particles have a conducting carbon coating on the surface.[15,16] Hence, in order to harness maximum electrode performance, both the surface area and conductivity of IER needs to be improved. A simple way to increase the total surface area of a material is by decreasing the average particle size. Mechanical milling, specifically cryomilling (77K using Liquid $N_2$) has been shown to effectively mill IER beads. Such milling (~1 h) can decrease the particle size by a factor of 16, which significantly increases the total surface area (~250 times).[17] Finally, to induce the necessary electrical conductivity, the surface of the milled IER can be pyrolyzed by heating to >800° C. for a very short time. Such controlled surface pyrolysis of the beads has been shown by Wilson et. al.[13] to provide necessary electrical conductivity and simultaneously increase the surface area by a factor of two. Depending on the temperature and length of pyrolysis, the thickness and nature of the surface carbon can be varied. The combination of ball milling and surface pyrolysis would provide conducting IER with total surface area comparable to that of currently used carbon aerogels (600-800 $m^2$/g).[5] A schematic of the proposed methods is given in FIG. 3. Once formed into an electrode, the electric field will drive ions to the electrode edge, but migration through the surface carbon and to the inner IER would be driven by diffusion.

Stage 3: High Surface Area, Ion-Penetrable, Carbon Coating of IER

Figure 4:
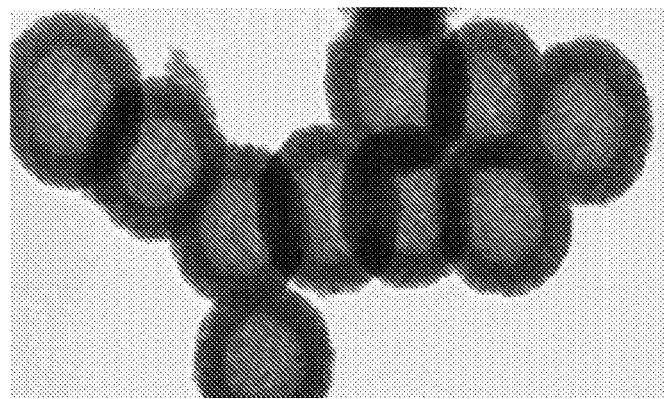
FIG. 4. TEM image of hollow carbon capsules. Taken from Bhattacharjya et al.

The nature and penetrability of the surface carbon on the IER is very important for ion-exchange. Since the penetrability of the surface carbon described above is not obvious, a third approach may be necessary. Several reports of hollow carbon capsules prepared from $SiO_2$ bead templates are available. The $SiO_2$ beads are coated with a mixture of resorcinol and formaldehyde, which crosslink, and upon pyrolysis a high surface area carbon layer is obtained on the $SiO_2$ beads (1600 $m^2$/g).[2] The silica core is then removed using NaOH etch to obtain hollow carbon spheres (FIG. 4). The successful $SiO_2$ etch using NaOH confirms movement of ions occur through the surface carbon. A similar resorcinol-formaldehyde carbonization of IER bead templates where the beads are retained post-pyrolysis could be explored. The success of this method depends on the relative thermal stabilities of the IER and the surface carbon coating. But with careful choice of bead and polymers and optimization of pyrolysis conditions, a high surface area carbon coated IER bead capable of ion-exchange could be prepared.

Outcomes

We aim and hope to prepare a high surface area, conductive IER-embedded electrode material suitable for use in a CDI system. Keeping in mind the end goal of applications for the developing world, we propose simple methods starting from commercially available bulk precursors. The real challenge for this project lies in identifying and optimizing several parameters: functional groups of IER, starting IER bead size, milling parameters, ideal milled-IER particle size, methodology for surface pyrolysis and resorcinol-formaldehyde carbonization, and electrode formulation. The various methods proposed above are listed in increasing degree of complexity. While each approach is designed to independently allow preparation of electrode materials, with careful comparison of resulting electrode materials, we can understand and correlate the conductivity and surface area of the materials to the electrode performance. Much of the optimization of electrode materials will be iterative, based on device testing. However, in order to understand the structure-performance correlation, we will need characterization tools such as electron microscopy (particle size and surface carbon thickness) and Raman spectroscopy (nature of surface carbon) among other methods. We will draw on expertise of the LBNL battery group for measuring physical properties of our CDI materials.

REFERENCES (1) van Weert, F.; van der Gun, J.; Reckman, J. *Global Overview of Saline Groundwater Occurrence and Genesis*, IGRAC Report, 2009.
(2) Bhattacharjya, D.; Kim, M.-S.; Bae, T.-S.; Yu, J.-S. *Journal of Power Sources* 2013, 244, 799.
(3) Kozisek, F. In *Nutrients in Drinking Water*; WHO Press: 2005, p 148.
(4) Knust, K. N.; Hlushkou, D.; Anand, R. K.; Tallarek, U.; Crooks, R. M. *Angewandte Chemie-International Edition* 2013, 52, 8107.
(5) Gabelich, C. J.; Tran, T. D.; Suffet, I. H. *Environmental Science & Technology* 2002, 36, 3010.
(6) Johnson, A. M.; Newman, J. *Journal of the Electrochemical Society* 1971, 118, 510.
(7) Noked, M.; Soffer, A.; Aurbach, D. *Journal of Solid State Electrochemistry* 2011, 15, 1563.
(8) Gao, Y.; Pan, L.; Li, H.; Zhang, Y.; Zhang, Z.; Chen, Y.; Sun, Z. *Thin Solid Films* 2009, 517, 1616.
(9) Li, H. B.; Lu, T.; Pan, L. K.; Zhang, Y. P.; Sun, Z. *Journal of Materials Chemistry* 2009, 19, 6773.
(10) Pan, L.; Wang, X.; Gao, Y.; Zhang, Y.; Chen, Y.; Sun, Z. *Desalination* 2009, 244, 139.
(11) Oren, Y. *Desalination* 2008, 228, 10.
(12) Hubicki, Z.; Jakowicz, A.; Lodyga, A. Adsorption and Its Applications in Industry and Environmental Protection, Vol Ii: Applications in Environmental Protection 1999, 120, 497.
(13) Wilson, M. S.; Delariva, A.; Garzon, F. H. *Journal of Materials Chemistry* 2011, 21, 7418.
(14) Marks, T.; Trussler, S.; Smith, A. J.; Xiong, D. J.; Dahn, J. R. *Journal of the Electrochemical Society* 2011, 158, A51.
(15) Delacourt, C.; Poizot, P.; Levasseur, S.; Masquelier, C. *Electrochemical and Solid State Letters* 2006, 9, A352.
(16) Padhi, A. K.; Nanjundaswamy, K. S.; Goodenough, J. B. *Journal of The Electrochemical Society* 1997, 144, 1188.
(17) Sung Paal Yim; Joon-Hyung Kim; Hun Hwee Park; Suh, I. S. *WMSYM* 1991, 2.

Example 3

Efficient and Affordable Electrode Materials for Capacitive Deionization

Background

Today 20% of the world's population lives in water-stressed areas and the number is expected to significantly increase in the next 10 years.' This water shortage is further aggravated by increased salinization of fresh water sources by agricultural or industrial effluents; forcing many communities to depend solely on saline or intermediate salinity (brackish) water sources.[2] Unfortunately, current desalination solutions are either inefficient or too expensive, and consequently inaccessible to the poor. Hence there is a need for an efficient, low-cost, and robust desalination technology that is capable of functioning off-grid for the treatment of highly dispersed brackish groundwater sources.

One promising technology is Capacitive Deionization (CDI). CDI has low-operating-costs, functions without membranes, is efficient at small scales and off-grid areas, and has low amounts of reject brine—making it suitable for remote parts of the developing world.[3-5] Despite these numerous desirable characteristics, the use of CDI has been limited due to high electrode costs and low ion removal speeds. We are, therefore, developing affordable and effective, new CDI electrode materials aimed at overcoming these limitations.

Innovation

Figure 5:
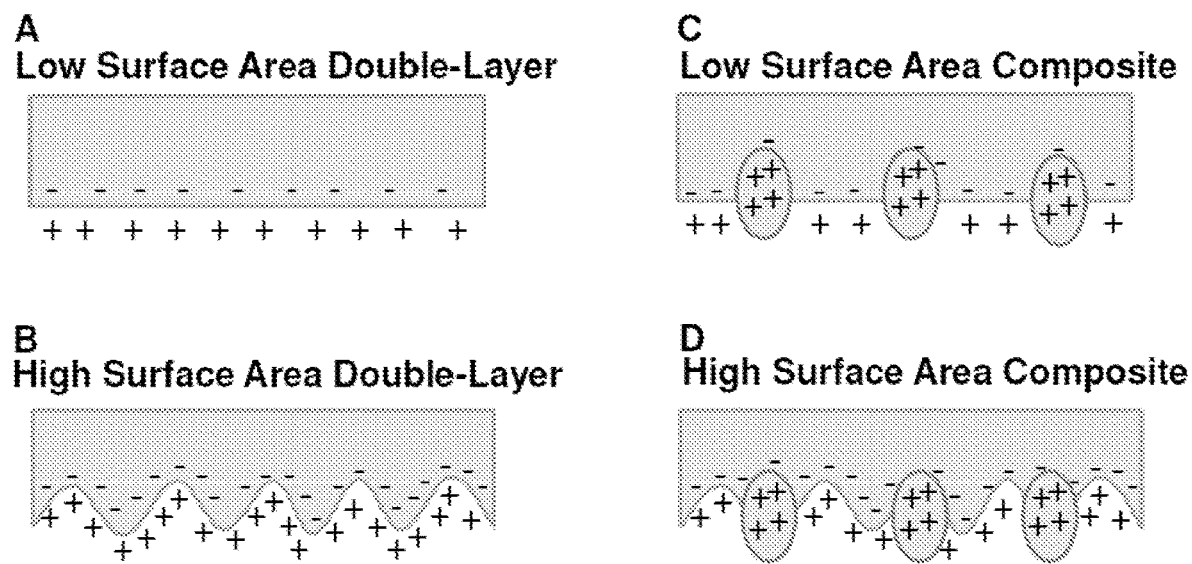
FIG. 5. Standard CDI vs. IER-composite CDI electrode which has additional electrode capacity due to embedded IERs (amber ellipses).
Figure 6:
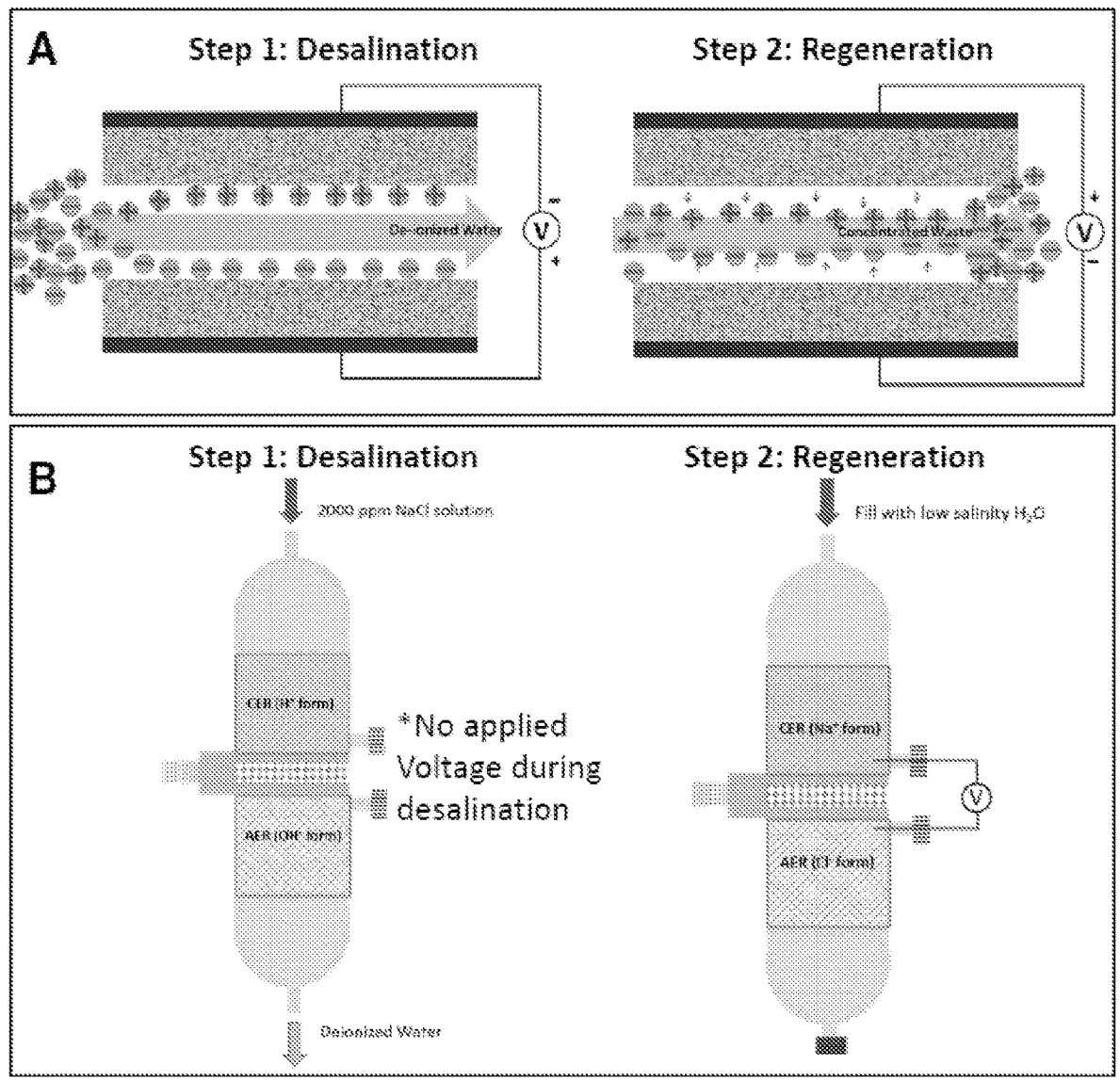
FIG. 6. Schematic showing desalination and regeneration stages in (A) CDI configuration and (B) column configuration.

Electrode materials for CDI must have high electrical conductivity, sufficient chemical stability, and high surface area available for ion adsorption. Several high surface area, conducting, carbon-based materials have even been previously tested for CDI, but they generally show limited capacity (surface area inaccessible to ions) or are exotic (expensive) for developing world applications.[6,7] Rather than focus on enhancing materials by solely increasing surface area, we are designing high capacity CDI electrodes (FIG. 5) by incorporating ion-exchange resins (IERs). IERs are inexpensive, high-capacity charge-trapping polymers, commonly used for water softening. The sustained use of IERs, however, currently requires regular chemical regeneration and thus a costly chemical supply chain. Our innovation overcomes this limitation, by instead employing in situ electrochemical regeneration of the IER. The consequent lower cost of IER regeneration, allows for inexpensive deionization methods. In addition to using electrochemically regenerated IER in CDI electrodes (FIG. 5), the method can also be used to replace the chemical regeneration process currently used for large scale IER columns (FIG. 6). As IER is commercially available and inexpensive, technologies based on electrochemical regeneration of IER hold promise of being effective and scalable desalination solutions.

Methods

The electrochemical regeneration of $Na^+$ saturated cation exchange resin (CER) and $NO_3^-$ saturated anion exchange resin (AER) was tested by generating high local concentrations of $H^+$ and $OH^-$ through electrolysis of water (1.23 V). The studies were conducted using electrodes made from a single layer of commercial IER beads (diameter~0.5 mm) packed in a metal mesh (for electrical contact). CER regeneration was tested at the anode ($2H_2O \rightarrow O_{2(g)}+4H^++4e^-$) while AER was tested at the cathode ($2H_2O+2e^- \rightarrow H_{2(g)}+2OH^-$). The CER/AER regeneration (i.e. $Na^+/NO_3^-$ expulsion and $H^+/OH^-$ uptake) was studied by monitoring the pH of the electrolyte.

Preliminary Results

Figure 7:
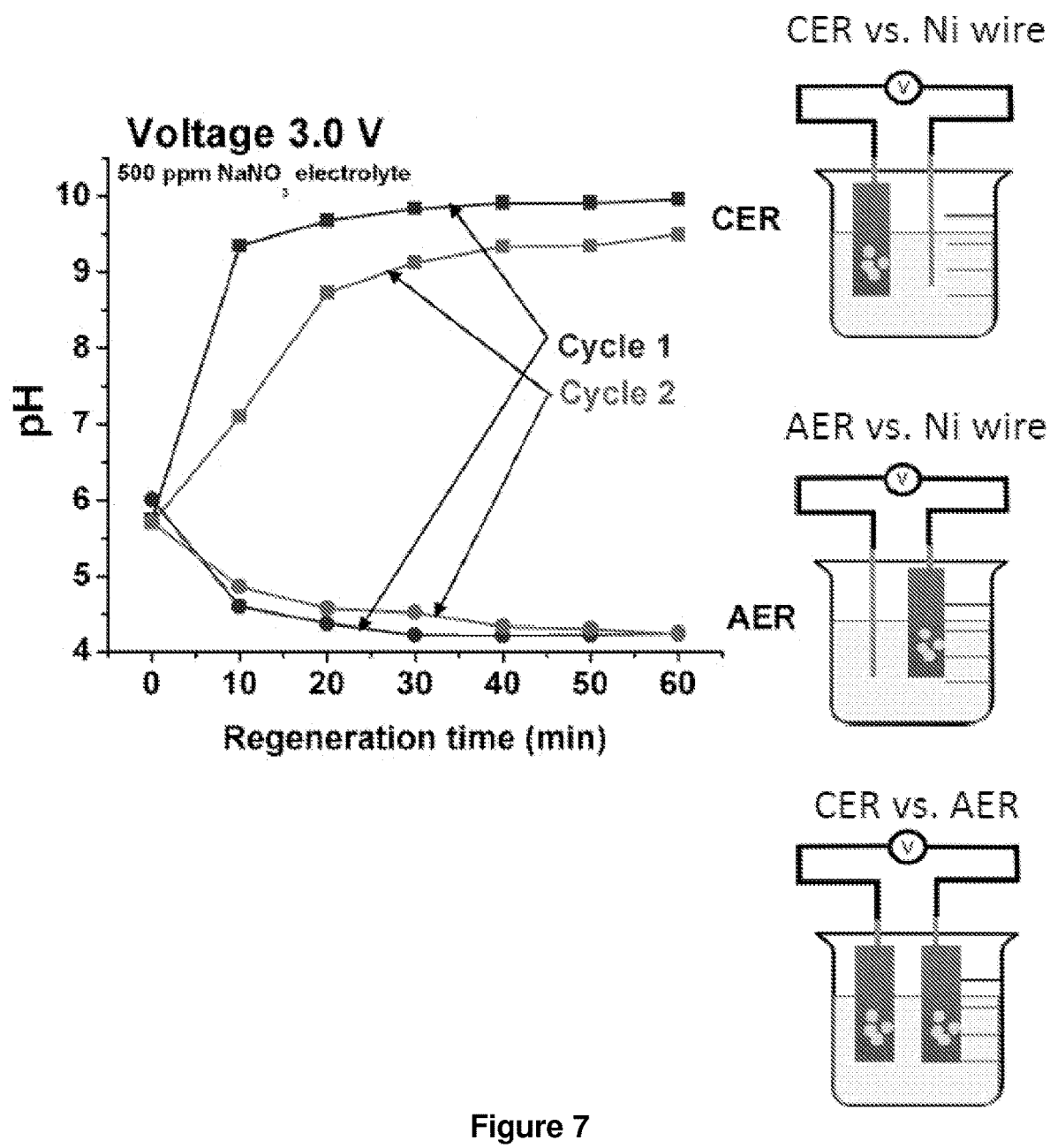
FIG. 7. Changes in solution pH as a function of regeneration time for beads saturated with $Na^+$ (CER) or $NO_3^-$ (AER) ions vs. Ni-wire counter electrode at 3V. Two consecutive regeneration cycles are shown.

Carrying out the experiments described above, we have successfully confirmed the electrochemical regeneration of both CER and AER vs. a Ni-metal counter electrode (FIG. 7). These experiments also demonstrate reproducible IER saturation-electrochemical regeneration cycles. Using similar methods, the simultaneous regeneration of CER and AER in the same container has also been verified—an essential achievement to realize our final technology.

Using a stainless steel mesh, we have shown the minimum necessary voltage for in situ regeneration of IER to be as low as 2V—a target voltage as it is a typical value used in commercial CDI units. As stainless steel has a relatively high overpotential for electrolysis, using non-precious metals such as nickel or titanium could further lower our operating voltages and thus operating costs.

As described earlier, in addition to CDI, we can incorporate the electrochemical regeneration of IER in column configurations. If the IER were to be used in columns, the need for applied voltages during the desalination step would be completely eliminated. The IER chemically trap the charges (deionization) and are then electrochemically regenerated with minimal applied voltage. We have successfully tested such a column configuration with the commercial CER and AER. The two types of resins were each placed in a metal mesh bag (for electrical contact) at opposite ends of a glass column, with an insulating polymer-mesh separator, and regenerated by applying a voltage.

Figure 8:
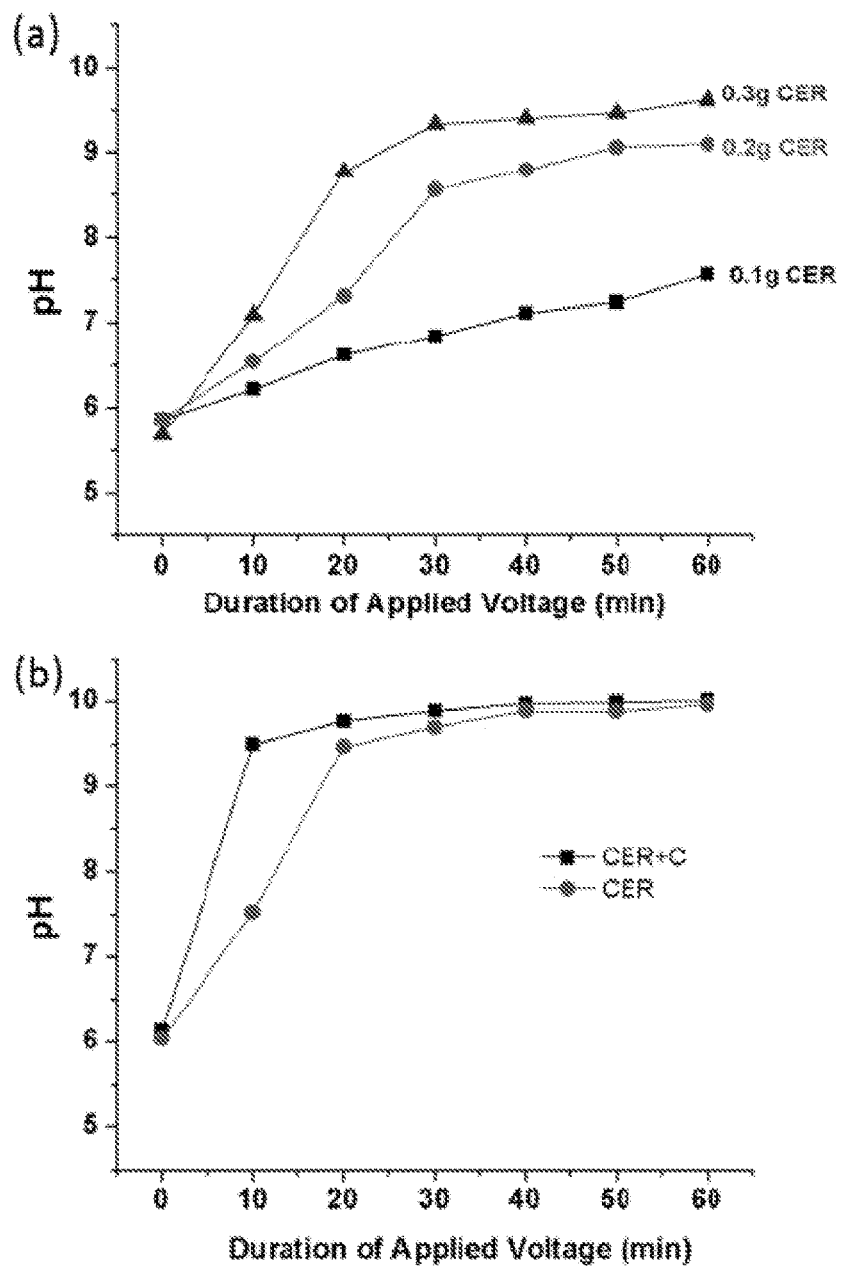
FIG. 8. Changes in solution pH as a function of duration of applied voltage for (a) different amounts of CER and (b) CER with and without conductive carbon additive.

Having successfully shown proof-of-concept results in beaker experiments, we are working to build a bench-top prototype. There are two key challenges to successfully going beyond the beaker: (i) the beads are not electrically conducting, and (ii) the total surface area of these IER beads is not very high (45 $m^2/g$). Fortunately, battery studies have shown significant improvements in the performance of insulating electrode materials by decreasing the average particle size and by using a conductive surface carbon-coating. We have successfully increased the surface area of the beads by mechanical milling and are exploring various methods of inducing necessary electrical conductivity: (i) close contact with metal mesh (ii) use of conductive carbon additives (iii) a thin carbon coating on IER surface, and (iv) embedding the IER in a 3D-carbon gel structure. For example, as shown in FIG. 8b, mixing CER with conductive carbon enhances the regeneration rate when compared to a CER-only baseline.

Figure 9:
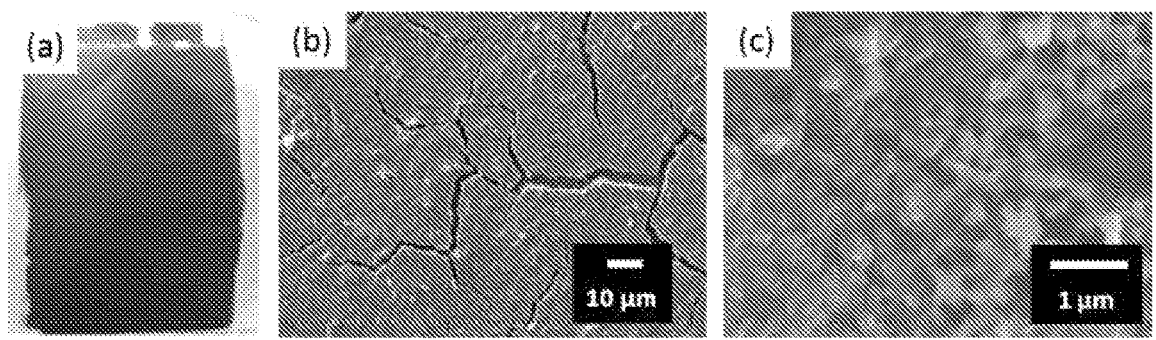
FIG. 9. IER embedded CDI electrode film photograph (a), and SEM images (b), (c).
Figure 10:
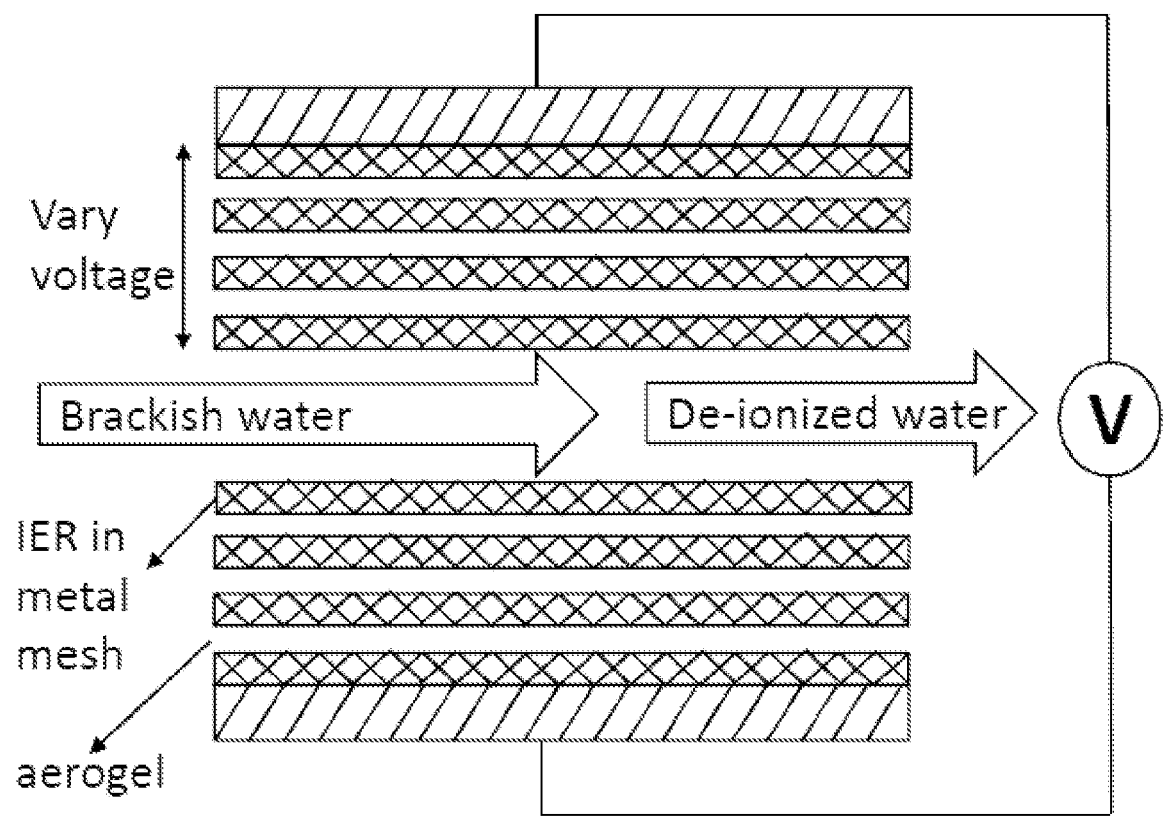
FIG. 10. Schematic of a device wherein the electrodes comprise multiple layers of wire meshes and each layer of wire mesh comprises a layer, such as a monolayer, of IER particles.

In order to determine the feasibility of IER-based electrode materials in a CDI system, we are developing methods to print electrodes onto metal plates for system-level testing and iterative optimization. Thus far, we have identified benign solvents and binders suitable for water treatment systems and successfully made electrode films embedded with milled IER (FIG. 9).

REFERENCES

1. F. and A. O. of the U. Nations, *India*, 2011.
2. F. van Weert, 2009.
3. C. Fritzmann, J. Löwenberg, T. Wintgens and T. Melin, *Desalination*, 2007, 216, 1-76.
4. L. D. Tijing, e.t. al, *J. Membr. Sci.*, 2015, 475, 215-244.
5. Y. Oren, *Desalination*, 2008, 228, 10-29.
6. A. M. Johnson and J. Newman, *J. Electrochem. Soc.*, 1971, 118, 510-&.
7. W. Huang, Y. Zhang, S. Bao and S. Song, *Surf Rev. Lett.*, 2013, 20.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What we claim is:

1. A system for removing dissolved ions from water, comprising: (a) a first electrode in contact with a first plurality of ion exchange resin (IER) particles, (b) a second electrode in contact with a second plurality of IER particles, (c) an voltage source, (d) a chamber defined by the first electrode and the second electrode, (e) an inlet, (f) a first outlet, and (g) optionally a second outlet, wherein the first electrode, the second electrode, and the electricity source are in electrical communication with each other, and the chamber is in fluid communication with the inlet, the first outlet, and optionally the second outlet, and optionally the voltage source is configured so that the direction of a current to the first electrode and the second electrode can be switched, wherein the first outlet and the second outlet are the same, and the system comprises a means to divert the flow from the first outlet to more than one direction.

2. The system of claim 1, wherein at least part or all of the IER particles of the first and/or second pluralities of IER particles are particles produced by the ball milling of IER beads.

3. The system of claim 1, wherein at least part of all of the IER particles of the first and/or second pluralities of IER particles comprise a surface that is conducting.

4. The system of claim 1, wherein the first electrode is the cathode, and at least part or all of the IER particles of the first plurality of IER particles are cation exchange resin (CER).

5. The system of claim 1, wherein the second electrode is the anode, and at least part or all of the IER particles of the second plurality of IER particles are anion exchange resin (AER).

6. The system of claim 1, wherein the first electrode and/or second electrode comprise wire meshes, wherein the IER particles are embedded on the surface of the wire meshes.

7. The system of claim 1, wherein the system further comprises at least one of: a means for sealing the inlet, a means for sealing the first outlet, and a means for sealing the second outlet.

8. A method for removing dissolved ions from ion-containing water comprising: (a) providing the system of claim 1; (b) flowing ion-containing water into the chamber via the inlet, (c) optionally running a direct current through the water via the first electrode and second electrode, (d) continuously flowing ion-containing water from the inlet into the chamber and out of the first outlet, wherein, in the chamber, one or more cations in the ion-containing water to associate to a IER particle of the first plurality of IER particles and one or more anions in the ion-containing water to associate to a IER particle of the second plurality of IER particles, such that deionized water flows out of the chamber via the first outlet, (e) stopping the flow of the ion-containing water of step (d), (f) running a direct current through the water in a direction reverse to the direct current of step (c) such that the cations dissociate from the IER particle of the first plurality of IER particles and the anions dissociate from the IER particle of the second plurality of IER particles to form waste water in the chamber, (g) flowing the waste water out of the chamber via the second outlet, and (h) optionally repeating steps (d) to (g).

9. A system for removing dissolved ions from water, comprising: (a) an inlet, (b) a first electrode in contact with a first plurality of ion exchange resin (IER) particles, (c) an insulating separator, (d) a second electrode in contact with a second plurality of IER particles, (e) an outlet, and (f) an voltage source, wherein (i) the insulating separator separates the first electrode and the second electrode, (ii) the first electrode, the second electrode, and the electricity source are in electrical communication with each other, and (iii) there is fluid communication in the following order: the inlet, the first electrode, the insulating separator, the second electrode, and the outlet, and optionally the voltage source is configured so that the direction of a current to the first electrode and the second electrode can be switched.

10. A method for removing dissolved ions from ion-containing water comprising: (a) providing the system or apparatus for removing dissolved ions from ion-containing water of the present invention; (b) flowing ion-water containing water into the system via the inlet, such that cations in the ion-water containing water associate with the CER, anions in the ion-water containing water associate with the AER, and water flowing out of the outlet has fewer ions than the ion-containing water flowing into the inlet, (c) regenerating the CER and AER comprising (i) flowing water containing fewer ions into the system via the inlet, (ii) closing the cutlet, and (iii) applying a voltage to the CER and AER, such that the cations disassociate from the CER and the anions disassociate from the AER, (d) opening the outlet to let the water containing the disassociated cation and anions in the system flow out, and (e) optionally repeating steps (b) to (e).

11. The method of claim 10, wherein the water containing fewer ions of step (c) (i) is water obtained from step (b).

* * * * *